US011981351B2

(12) United States Patent
Qi et al.

(10) Patent No.: US 11,981,351 B2
(45) Date of Patent: May 14, 2024

(54) SYSTEMS AND METHODS FOR DETECTING MISBEHAVIOR BEHAVIOR BASED ON FUSION DATA AT AN AUTONOMOUS DRIVING SYSTEM

(71) Applicant: GM Global Technology Operations LLC, Detroit, MI (US)

(72) Inventors: Wenyuan Qi, Shanghai (CN); Kemal Ertugrul Tepe, Huntington Woods, MI (US); Mohammad Naserian, Windsor (CA); Tianxiang Cao, Shanghai (CN); Zhengyu Xing, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 253 days.

(21) Appl. No.: 17/681,078

(22) Filed: Feb. 25, 2022

(65) Prior Publication Data

US 2023/0242152 A1   Aug. 3, 2023

(30) Foreign Application Priority Data

Jan. 29, 2022   (CN) .......................... 202210110169.7

(51) Int. Cl.
*B60W 60/00* (2020.01)
*B60W 50/00* (2006.01)
(Continued)

(52) U.S. Cl.
CPC .... *B60W 60/0015* (2020.02); *B60W 50/0098* (2013.01); *G08G 1/096708* (2013.01);
(Continued)

(58) Field of Classification Search
CPC ......... B60W 60/0015; B60W 50/0098; B60W 2556/65; B60W 2556/35; B60W 2020/06;
(Continued)

(56) References Cited

U.S. PATENT DOCUMENTS

2017/0132922 A1\* 5/2017 Gupta .................. G08G 1/0962
2019/0285726 A1\* 9/2019 Muto ........................ G01S 7/40
(Continued)

FOREIGN PATENT DOCUMENTS

CN      113012429 A    6/2021
DE   102018120655 A1   2/2019
(Continued)

OTHER PUBLICATIONS

Twardokus, Targeted Discreditation Attack against Trust Management in Connected Vehicles, Aug. 6, 2021, IEEE, pp. 1-6 (2021).

*Primary Examiner* — Peter D Nolan
*Assistant Examiner* — Wae L Louie
(74) *Attorney, Agent, or Firm* — Vivacqua Crane, PLLC

(57) ABSTRACT

An automated driving system (ADS) of an autonomous vehicle includes a communication module, a misbehavior detection module, and a processor. The communication module is configured to receive a vehicle-to-vehicle (V2V) message including source vehicle data and receive a fusion data message including fusion data from a mobile edge computing (MEC) system including a roadside unit (RSU). The source vehicle data includes a source vehicle location. The fusion data is based on RSU sensed data and on vehicle sensed data received at the RSU from at least one vehicle. The misbehavior detection module is configured to determine whether a source vehicle is disposed at the source vehicle location based on the fusion data. The processor is configured to manage performance of the autonomous vehicle in accordance with the source vehicle data based at least in part on the determination. Other embodiments are described and claimed.

18 Claims, 5 Drawing Sheets

(51) Int. Cl.
  *G08G 1/0967* (2006.01)
  *H04W 12/121* (2021.01)
(52) U.S. Cl.
  CPC . *G08G 1/096783* (2013.01); *G08G 1/096791* (2013.01); *H04W 12/121* (2021.01); *B60W 2050/0022* (2013.01); *B60W 2520/06* (2013.01); *B60W 2520/10* (2013.01); *B60W 2520/105* (2013.01); *B60W 2556/35* (2020.02); *B60W 2556/65* (2020.02)
(58) Field of Classification Search
  CPC ....... B60W 2020/10; B60W 2020/105; H04W 12/121; G08G 1/096708; G08G 1/096783; G08G 1/096791
  See application file for complete search history.

(56) References Cited

U.S. PATENT DOCUMENTS

| | | | |
|---|---|---|---|
| 2020/0017114 A1 | 1/2020 | Santoni et al. | |
| 2020/0105131 A1* | 4/2020 | Carter | G08G 1/0133 |
| 2020/0137580 A1* | 4/2020 | Yang | H04W 4/46 |
| 2020/0334978 A1* | 10/2020 | Pittman | G08G 1/0112 |
| 2023/0122124 A1* | 4/2023 | Vassilovski | H04W 4/44 701/26 |
| 2023/0156621 A1* | 5/2023 | Shuman | G08G 1/096716 455/522 |
| 2023/0174097 A1* | 6/2023 | Kakuta | B60W 60/001 701/24 |
| 2023/0242152 A1* | 8/2023 | Qi | G08G 1/096783 701/24 |
| 2023/0286520 A1* | 9/2023 | Qi | H04W 12/106 |
| 2023/0316920 A1* | 10/2023 | Di Cairano | B60W 30/09 701/26 |
| 2023/0322259 A1* | 10/2023 | Sadek | B60W 60/0015 701/23 |
| 2023/0345249 A1* | 10/2023 | Ansari | H04L 63/1441 |
| 2023/0354002 A1* | 11/2023 | Shuman | G08G 1/096791 |

FOREIGN PATENT DOCUMENTS

| | | |
|---|---|---|
| DE | 102019111387 A1 | 11/2019 |
| DE | 112017007393 | 12/2019 |
| DE | 102020102426 A1 | 9/2020 |

* cited by examiner

SYSTEMS AND METHODS FOR DETECTING MISBEHAVIOR BEHAVIOR BASED ON FUSION DATA AT AN AUTONOMOUS DRIVING SYSTEM

INTRODUCTION

The technical field generally relates to autonomous vehicles, and more particularly relates to systems and methods for detecting malicious vehicle-to-vehicle (V2V) messages at an autonomous driving system.

Autonomous vehicles are typically configured to receive vehicle-to-vehicle (V2V) messages from other autonomous vehicles. A V2V message includes a vehicle identifier and vehicle data associated with the transmitting vehicle. Automated driving systems (ADS) of autonomous vehicles often rely on the vehicle data contained in V2V messages received from other autonomous vehicles to properly guide and navigate the autonomous vehicle.

A malicious entity may send a malicious V2V message that appears to be a legitimate V2V message via a wireless communication channel to an autonomous vehicle. The malicious entity may seek to appear as another autonomous vehicle that does not actually exist. The non-existent autonomous vehicle may be referred to as a ghost vehicle. The malicious V2V message may include malicious vehicle data associated with the ghost vehicle.

The ADS at an autonomous vehicle may rely on malicious vehicle data in received malicious V2V messages to implement one or more actions that could potentially lead to degradation in traffic related guidance efficiencies or implementation of maneuvers to avoid non-existent ghost vehicles that may lead to potential accidents. It may be beneficial for an ADS to be able to identify malicious V2V messages in order to avoid use of malicious vehicle data that may impact the ability of the ADS to appropriately guide and navigate an autonomous vehicle.

SUMMARY

In an embodiment, an automated driving system (ADS) of an autonomous vehicle includes a communication module, a misbehavior detection module, and a processor. The communication module is configured to receive a vehicle-to-vehicle (V2V) message including source vehicle data and receive a fusion data message including fusion data from a mobile edge computing (MEC) system including a roadside unit (RSU). The source vehicle data includes a source vehicle location. The fusion data is based on RSU sensed data and on vehicle sensed data received at the RSU from at least one vehicle. The misbehavior detection module is configured to determine whether a source vehicle is disposed at the source vehicle location based on the fusion data. The processor is configured to manage performance of the autonomous vehicle in accordance with the source vehicle data based at least in part on the determination.

In an embodiment, the fusion data is based on a weighted RSU sensed data and a weighted vehicle sensed data, a first weight associated with the RSU sensed data being greater than a second weight associated with the weighted vehicle sensed data.

In an embodiment, the misbehavior detection module is configured to determine whether the source vehicle data passes a vehicle plausibility check and the processor is configured to manage performance of the autonomous vehicle in accordance with the source vehicle data based in part on the determination.

In an embodiment, the vehicle plausibility check of the source vehicle data includes at least one of source vehicle speed plausibility check, a source vehicle position plausibility check, a vehicle acceleration plausibility check, a vehicle sudden appearance plausibility check, a vehicle message frequency plausibility check, a vehicle heading plausibility check, and a vehicle successive message consistency plausibility check.

In an embodiment, the misbehavior detection module is configured to classify the V2V message as a malicious V2V message upon a determination that the source vehicle is not disposed at the source vehicle location.

In an embodiment, the system includes a misbehavior reporting module configured to report a source vehicle identifier associated with the malicious V2V message to a security credentials management system (SCMS).

In an embodiment, the fusion data message is a message broadcast by the MEC system.

In an embodiment, a computer readable medium includes instructions stored thereon for detection of misbehavior at an automated driving system (ADS), that upon execution by a processor, cause the processor to: receive a vehicle-to-vehicle (V2V) message including source vehicle data, the source vehicle data including a source vehicle location; receive a fusion data message including fusion data from a mobile edge computing (MEC) system including a roadside unit (RSU), the fusion data being based on RSU sensed data and on vehicle sensed data received at the RSU from at least one vehicle; determine whether a source vehicle is disposed at the source vehicle location based on the fusion data; and manage performance of the autonomous vehicle in accordance with the source vehicle data based at least in part on the determination.

In an embodiment, the computer readable medium further includes instructions to cause the processor to receive the fusion data message including the fusion data, the fusion data being based on a weighted RSU sensed data and a weighted vehicle sensed data, a first weight associated with the RSU sensed data being greater than a second weight associated with the weighted vehicle sensed data.

In an embodiment, the computer readable medium further includes instructions to cause the processor to determine whether the source vehicle data passes a vehicle plausibility check and manage performance of the autonomous vehicle in accordance with the source vehicle data based in part on the determination.

In an embodiment, the computer readable medium further includes instructions to cause the processor to perform the vehicle plausibility check of the source vehicle data, the vehicle plausibility check including at least one of source vehicle speed plausibility check, a source vehicle position plausibility check, a vehicle acceleration plausibility check, a vehicle sudden appearance plausibility check, a vehicle message frequency plausibility check, a vehicle heading plausibility check, and a vehicle successive message consistency plausibility check.

In an embodiment, the computer readable medium further includes instructions to cause the processor to classify the V2V message as a malicious V2V message upon a determination that the source vehicle is not disposed at the source vehicle location.

In an embodiment, the computer readable medium further includes instructions to cause the processor to report a source vehicle identifier associated with the malicious V2V message to a security credentials management system (SCMS).

In an embodiment, the computer readable medium further includes instructions to cause the processor to receive the fusion data message, the fusion data message including a message broadcast by the MEC system.

In an embodiment, a method of detecting misbehavior at an automated driving system (ADS) of an autonomous vehicle includes: receiving a vehicle-to-vehicle (V2V) message including source vehicle data at the autonomous vehicle, the source vehicle data including a source vehicle location; receiving a fusion data message including fusion data from a mobile edge computing (MEC) system including a roadside unit (RSU) at the autonomous vehicle, the fusion data being based on RSU sensed data and on vehicle sensed data received at the RSU from at least one vehicle; determining whether a source vehicle is disposed at the source vehicle location based on the fusion data at a misbehavior detection system; and managing performance of the autonomous vehicle in accordance with the source vehicle data based at least in part on the determination.

In an embodiment, the method further includes receiving the fusion data message including the fusion data, the fusion data being based on a weighted RSU sensed data and a weighted vehicle sensed data, a first weight associated with the RSU sensed data being greater than a second weight associated with the weighted vehicle sensed data.

In an embodiment, the method further includes determining whether the source vehicle data passes a vehicle plausibility check at the misbehavior detection system and manage performance of the autonomous vehicle in accordance with the source vehicle data based in part on the determination.

In an embodiment, the method further includes performing the vehicle plausibility check of the source vehicle data, the vehicle plausibility check including at least one of source vehicle speed plausibility check, a source vehicle position plausibility check, a vehicle acceleration plausibility check, a vehicle sudden appearance plausibility check, a vehicle message frequency plausibility check, a vehicle heading plausibility check, and a vehicle successive message consistency plausibility check.

In an embodiment, the method further includes classifying the V2V message as a malicious V2V message upon a determination by the misbehavior detection system that the source vehicle is not disposed at the source vehicle location.

In an embodiment, the method further includes reporting a source vehicle identifier associated with the malicious V2V message to a security credentials management system (SCMS).

BRIEF DESCRIPTION OF THE DRAWINGS

Exemplary embodiments will hereinafter be described in conjunction with the following drawing figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It may be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It may be noted that many alternative or additional functional relationships or physical connections may be present in an embodiment of the present disclosure.

Figure 1:
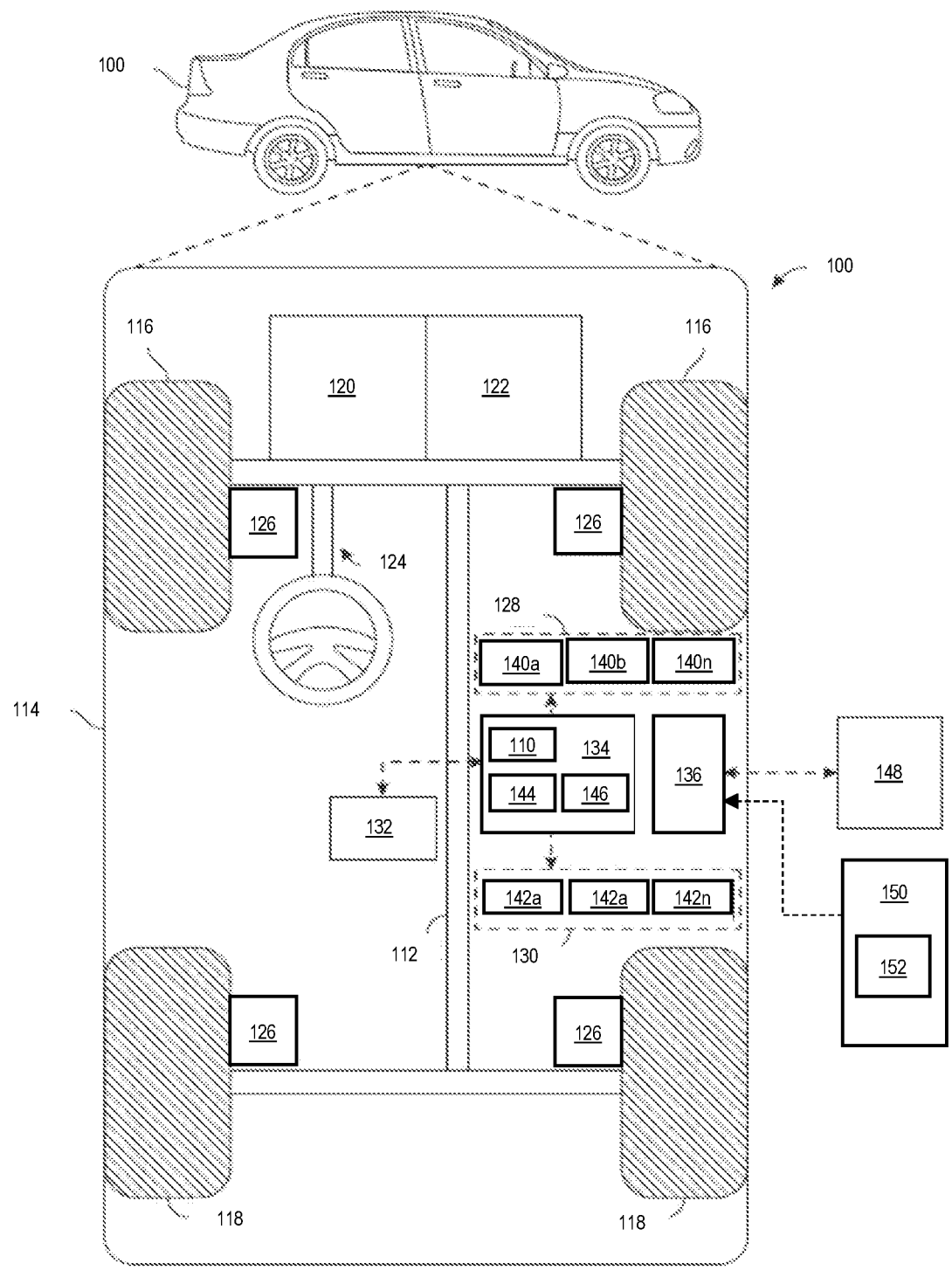
FIG. 1 is a functional block diagram representation of an autonomous vehicle including an embodiment of a misbehavior detection system.

Referring to FIG. 1 a functional block diagram representation of an autonomous vehicle 100 including an embodiment of a misbehavior detection system 110 is shown. The autonomous vehicle 100 generally includes a chassis 112, a body 114, front wheels 116, and rear wheels 118. The body 114 is arranged on the chassis 112 and substantially encloses components of the autonomous vehicle 100. The body 114 and the chassis 112 may jointly form a frame. The front wheels 116 and the rear wheels 118 are each rotationally coupled to the chassis 112 near a respective corner of the body 114.

The autonomous vehicle 100 is, for example, a vehicle that is automatically controlled to carry passengers from one location to another. While the autonomous vehicle 100 is depicted in the illustrated embodiment as a passenger car, other examples of autonomous vehicles include, but are not limited to, motorcycles, trucks, sport utility vehicles (SUVs), recreational vehicles (RVs), marine vessels, and aircraft. In an embodiment, the autonomous vehicle 100 is a so-called Level Four or Level Five automation system. A Level Four system indicates "high automation", referring to the driving mode-specific performance by an automated driving system (ADS) of all aspects of the dynamic driving task, even if a human driver does not respond appropriately to a request to intervene. A Level Five system indicates "full automation", referring to the full-time performance by an ADS of all aspects of the dynamic driving task under all roadway and environmental conditions that can be managed by a human driver.

As shown, the autonomous vehicle 100 generally includes a propulsion system 120, a transmission system 122, a steering system 124, a brake system 126, a vehicle sensor system 128, an actuator system 130, at least one data storage device 132, at least one controller 134, and a vehicle communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116 and the rear wheels 118 according to selectable speed ratios. According to various embodiments, the transmission system 122 may include a step-ratio automatic transmission, a continuously-variable transmission, or other appropriate transmission. The brake system 126 is configured to provide braking torque to the front wheels 116 and the rear wheels 118. The brake system 126 may, in various embodiments, include friction brakes, brake by wire, a regenerative braking system such as an electric machine, and/or other appropriate braking systems. The steering system 124 influences a position of the front wheels 116 and the rear wheels 118. While depicted as including a steering wheel for illustrative purposes, in some embodiments contemplated within the scope of the present disclosure, the steering system 124 may not include a steering wheel.

The vehicle sensor system 128 includes one or more vehicle sensing devices 140a-140n that sense observable conditions of the exterior environment and/or the interior environment of the autonomous vehicle 100. Examples of vehicle sensing devices 140a-140n include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as for example, but not limited to, the propulsion system 120, the transmission system 122, the steering system 124, and the brake system 126. In various embodiments, the vehicle features can further include interior and/or exterior vehicle features such as for example, but are not limited to, doors, a trunk, and cabin features such as for example air, music, and lighting.

The vehicle communication system 136 is configured to wirelessly communicate information to and from other entities (vehicle-to-everything (V2X) communication). For example, the vehicle communication system 136 is configured to wireless communicate information to and from other vehicles 148 ("V2V" communication), to and from driving system infrastructure ("vehicle to everything (V2I)" communication), remote systems, and/or personal devices. Examples of driving system infrastructure include, but are not limited, a mobile edge computing (MEC) system 150 including a roadside unit (RSU) 152. In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The data storage device 132 stores data for use in automatically controlling the autonomous vehicle 100. The data storage device 132 may be part of the controller 134, separate from the controller 134, or part of the controller 134 and part of a separate system.

The controller 134 includes at least one processor 144 and a computer readable storage device 146. The computer readable storage device 146 may also be referred to a computer readable media 146 and a computer readable medium 146. In an embodiment, the computer readable storage device 146 includes an embodiment of the misbehavior detection system 110. The processor 144 can be any custom made or commercially available processor, a central processing unit (CPU), a graphics processing unit (GPU), an auxiliary processor among several processors associated with the controller 134, a semiconductor-based microprocessor (in the form of a microchip or chip set), a macroprocessor, any combination thereof, or generally any device for executing instructions. The computer readable storage device 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the autonomous vehicle 100.

The instructions may include one or more separate programs, each of which comprises an ordered listing of executable instructions for implementing logical functions. The instructions, when executed by the processor 144, receive and process signals from the vehicle sensor system 128, perform logic, calculations, methods and/or algorithms for automatically controlling the components of the autonomous vehicle 100, and generate control signals to the actuator system 130 to automatically control one or more components of the autonomous vehicle 100 based on the logic, calculations, methods, and/or algorithms. Although only one controller 134 is shown in FIG. 1, alternative embodiments of the autonomous vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the autonomous vehicle 100.

In various embodiments, one or more instructions of the controller 134 are embodied to provide ADS functions as described with reference to one or more of the embodiments herein. The controller 134 or one of its functional modules is configured to implement the functions described with reference to one or a combination of embodiments of the misbehavior detection system 110.

Figure 2:
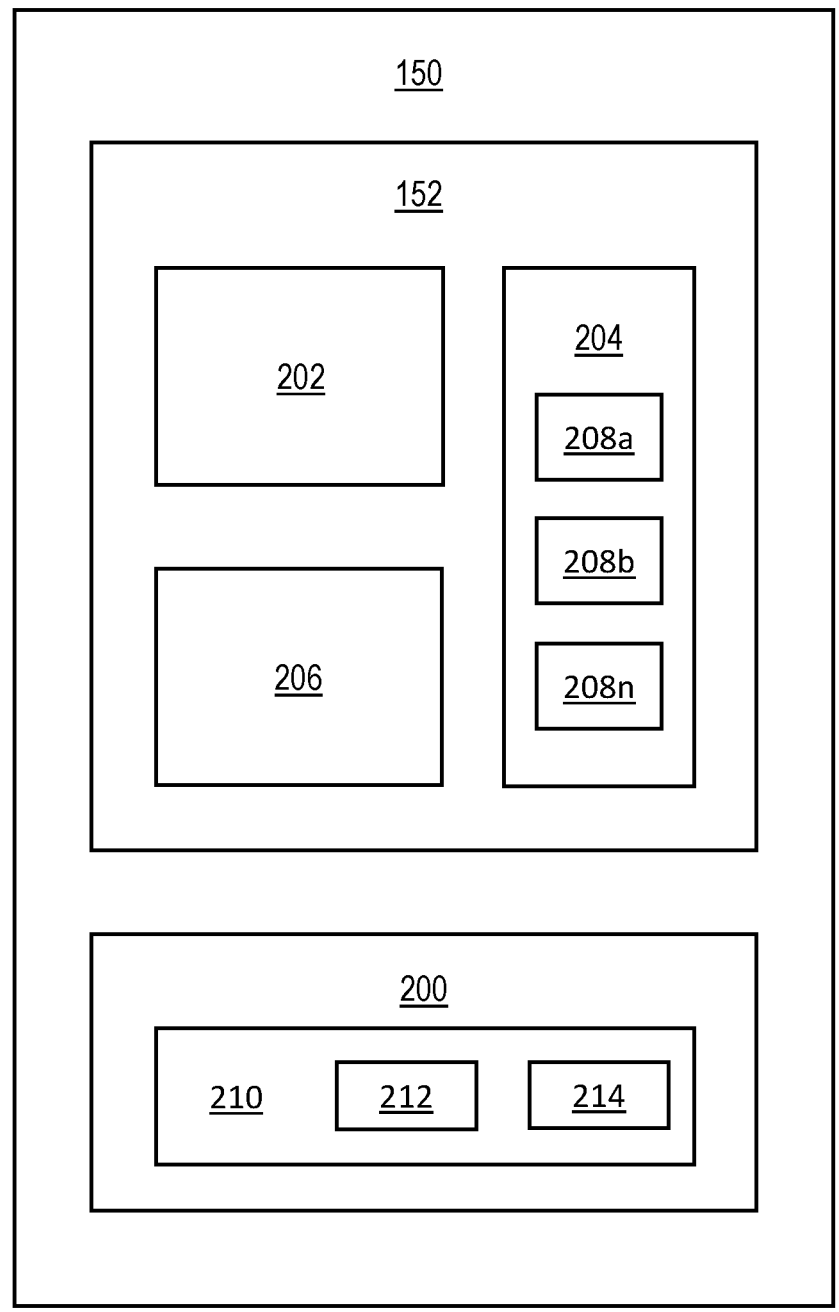
FIG. 2 is a functional block diagram representation of an example mobile edge computing (MEC) system including a roadside unit (RSU)

Referring to FIG. 2, a functional block diagram representation of an example MEC system 150 including a RSU 152 is shown. The MEC system 150 includes the RSU 152 and a computing system 200. In an embodiment, the MEC system 150 includes an RSU 152 integrated with the computing system 200. In an embodiment, the computing system 200 and the RSU 152 are independent entities, where the computing system 200 is disposed within communication range of the RSU 152.

In an embodiment, the RSU 152 includes a RSU controller 202, a RSU sensor system 204, and a RSU communication system 206. The RSU sensor system 204 includes one or more RSU sensor devices 208a-208n that sense observable conditions associated with vehicles that pass by the RSU 152. Examples of RSU sensing devices 208a-208n include, but are not limited to, radars, lidars, optical cameras, thermal cameras, ultrasonic sensors, and/or other sensors. The RSU sensor system 204 is configured to generate RSU sensed data including sensor data associated with vehicles locations of vehicles disposed within range of the RSU sensor system 204. The RSU sensor system 204 may be configured to generate RSU sensed data associated with other attributes of vehicles disposed within range of the RSU sensor system 204.

In an embodiment, the RSU communication system 206 is a wireless communication system configured to receive V2I messages including vehicle sensed data from vehicles within range of the RSU 152. The RSU communication system 206 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Each of the vehicles that a V2I message is received from at the RSU 152 includes a vehicle controller, a vehicle sensor system, and a vehicle communication system. The vehicle sensor system is configured to sense other vehicles and objects within range of the vehicle sensor system and generate vehicle sensed data. The vehicle controller is configured to generate a V2I message including the vehicle sensed data. The vehicle communication system is configured to transmit the V2I message including the vehicle sensed data to the RSU 152. The V2I message is received by the RSU communication system 206 at the RSU 152.

In an embodiment, the computing system 200 includes a controller 210. In an embodiment, the controller 210 includes one or more processors 212 and a collaborative sensing module 214. The collaborative sensing module 214 is configured to generate fusion data based on the RSU sensed data generated by the RSU sensor system 204 and the vehicle sensed data received in the V2I messages from the vehicles within range of the RSU 152. The RSU sensed data is not associated with specific vehicle coordinates. The collaborative sensing module 214 is configured to fuse RSU sensed data and the vehicle sensed data using global coordinates, such for example global positioning system (GPS) coordinates, to generate the fusion data. The collaborative sensing module 214 is configured to generate updated fusion data based on updated RSU sensed data received from the RSU sensor system 204 and updated vehicle sensed data received in V2I messages on a periodic basis.

In an embodiment, the collaborative sensing module 214 is configured to apply a first weight to the RSU sensed data and a second weight to vehicle sensed data to generate the fusion data, where the first weight is greater than the second weight. A V2I message received at the RSU 152 may be a malicious message. The lower weight is applied to the vehicle sensed data received in V2I messages to reduce the impact of potentially malicious V2I messages on the integrity of the fusion data.

The RSU communication system 206 is configured to broadcast a fusion data message including the fusion data generated by the collaborative sensing module 214. The fusion data is updated on a periodic basis and fusion messages including the updated fusion data is broadcast on a periodic basis. The vehicles within range of the RSU 152 receive the broadcasted fusion data message. The fusion data message may be referred to as a Customized Basic Safety Messages (BSM). The MEC system 150 may include additional components that facilitate the operation of the MEC system 150. While one configuration of a MEC system is shown, alternative embodiments may include other configurations of the MEC system.

Figure 3:
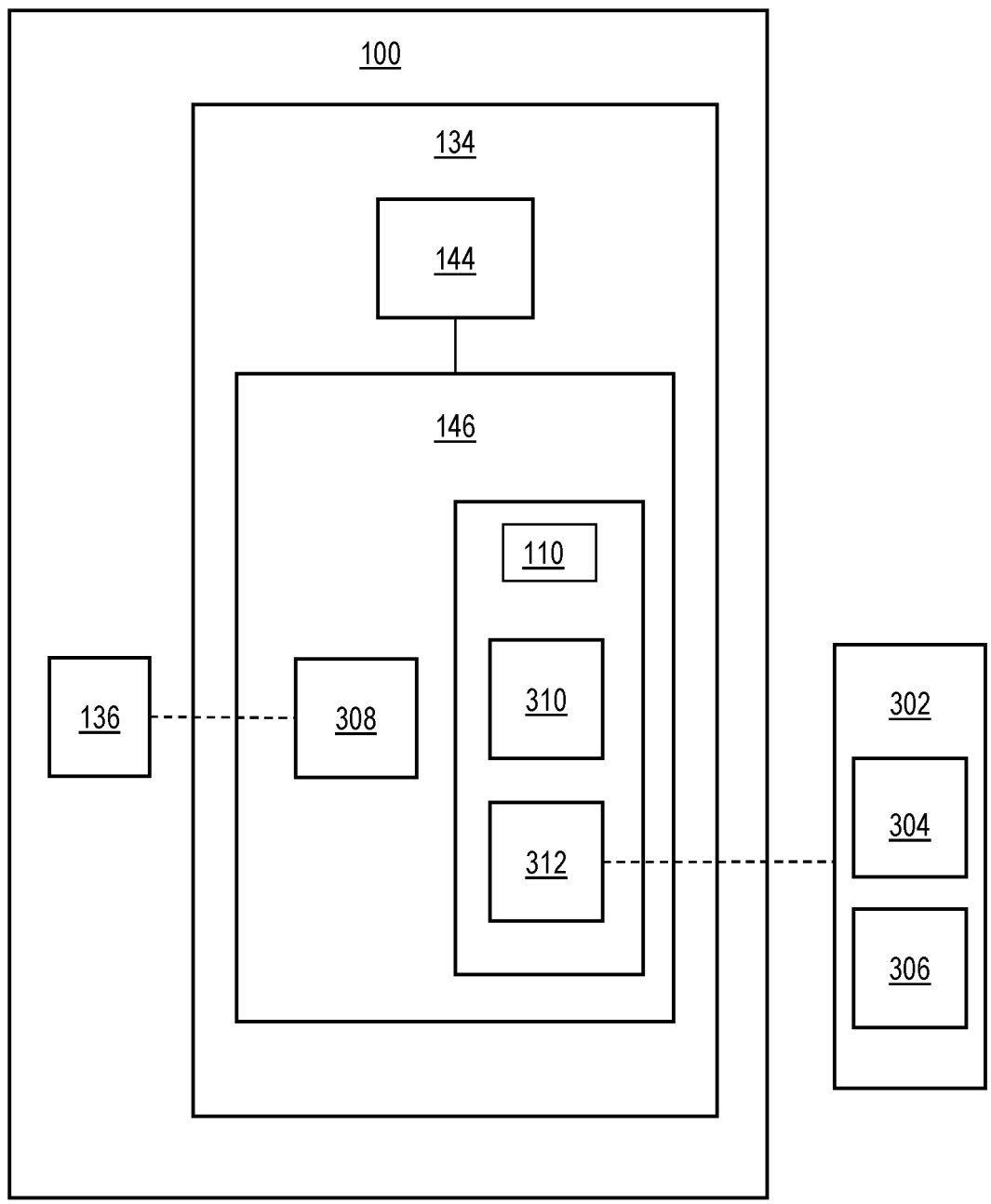
FIG. 3 is a functional block diagram representation of a controller of an autonomous vehicle including an embodiment of a misbehavior detection system.

Referring to FIG. 3 a functional block diagram representation of a controller 134 of an autonomous vehicle 100 including an embodiment of a misbehavior detection system 110 is shown. The controller 134 is configured to be communicatively coupled to the vehicle communication system 136. In an embodiment, the controller 134 is configured to be communicatively coupled to a security credentials management system (SCMS) 302. In an embodiment, the SCMS 302 is located at a back-end office. In an embodiment, the SCMS 302 is located at an edge computing cluster. The SCMS 302 includes a certificate authority (CA) 304 and a misbehavior authority 306.

The vehicle communication system 136 is configured to receive fusion data messages broadcast by the MEC system 150 and V2V messages via a wireless communication channel. Each received V2V message includes a source vehicle identifier and source vehicle data. The source vehicle identifier identifies a source vehicle that the V2V message was allegedly transmitted from to the autonomous vehicle 100. In an embodiment, the source vehicle data includes a source vehicle location. In an embodiment, a V2V message received from a source vehicle including source vehicle data is referred to as a Basic Safety Message (BSM).

In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In an embodiment, the controller 134 implements the ADS in the autonomous vehicle 100. That is, suitable software and/or hardware components of controller 134 (e.g., the processor 144 and the computer-readable storage device 146) are utilized to provide an ADS that is used in conjunction with other components of the autonomous vehicle 100. In an embodiment, the instructions of the ADS are organized by function or system. In an embodiment, the misbehavior detection system 110 described herein and its functions are part of the ADS and implement at least a part of the functions of the ADS. The ADS includes additional components (not shown) that facilitate operation of the autonomous vehicle 100. The controller 134 is configured to be communicatively coupled to other components of the autonomous vehicle 100 (not shown) to facilitate operation of the ADS.

The controller 134 includes at least one processor 144 and a memory 146. The memory 146 is also referred to as a computer readable storage device, computer readable media, or computer readable medium. In an embodiment, the memory 146 includes an embodiment of the misbehavior detection system 110 and a communication module 308.

The communication module 308 is configured to process the received V2V messages and the received fusion data messages. The communication module 308 is configured to process received the V2V messages and the received fusion data messages in accordance with a physical layer (PHY), a media access control (MAC), and a wave short message protocol (WSMP) associated with the V2V messages and the fusion data messages.

In an embodiment, the communication module 308 includes a security services layer. In an embodiment, the communication module 308 includes an IEEE 1609.2 security services layer. The security services layer is configured to determine whether a certificate associated with a received V2V message and/or a received fusion data message is an authorized or legitimate certificate.

The communication module 308 includes a V2X application. In an embodiment, the V2X application is configured to generate the source vehicle data based on a V2V messages received at the communication module 308 via the vehicle communication system 136. The source vehicle data includes source vehicle attributes of the source vehicle. Examples of the source vehicle attributes include, but are not limited to, a speed of the source vehicle, a source vehicle location, an acceleration of the source vehicle, and a heading of the source vehicle. The V2V message includes a time stamp and a source vehicle identifier associated with the source vehicle. In an embodiment, the V2X application is configured to generate the fusion data received in a fusion data message.

In an embodiment, the V2X application is configured to analyze the source vehicle data to determine whether there is a potential risk to the autonomous vehicle 100. The ADS uses the potential risk identified by the V2X application to implement one or more risk avoidance actions. For example, the source vehicle data associated with a source vehicle may indicate that the source vehicle is located at an intersection. The V2X application may determine that the source vehicle poses a potential collision risk to the autonomous vehicle 100. The ADS may implement one or more actions to slow down or stop the autonomous vehicle 100 to avoid a potential collision with the source vehicle by issuing commands to the brake system 126.

In an embodiment, the misbehavior detection system 110 includes a misbehavior detection module 310. In an embodiment, the misbehavior detection system 110 includes a misbehavior detection module 310 and a misbehavior reporting module 312. The misbehavior detection module 310 is configured to determine whether a source vehicle is physically located at the source vehicle location included in the V2V message based on the fusion data to determine whether a received V2V message is one of legitimate V2V message and a malicious V2V message. The misbehavior detection module 310 is configured to transform the fusion data based on global coordinates into coordinates associated with specific vehicles. The misbehavior detection module 310 is configured to compare the coordinates associated with the specific vehicles with the coordinates associated with the source vehicle location to determine whether a source vehicle is physically located at the source vehicle location, In an embodiment, if the misbehavior detection module 310 determines that a source vehicle is physically located at the source vehicle location in the V2V message, the misbehavior detection module 310 determines that the V2V message is a legitimate V2V message. In an embodiment, if the misbehavior detection module 310 determines that a source vehicle is not physically located at the source vehicle location in the V2V message, the misbehavior detection module 310 determines that the V2V message is a malicious V2V message.

In an embodiment, if the misbehavior detection module 310 determines that a source vehicle is physically located at the source vehicle location in the V2V message, the misbehavior detection module 310 is configured to perform a vehicle plausibility check of the vehicle attributes included in the V2V message to determine whether the V2V message is a legitimate V2V message. If the vehicle attributes pass the vehicle plausibility check, the misbehavior detection module 310 determines that the V2V message is a legitimate V2V message. If one or more of the vehicle attributes fail to pass the vehicle plausibility check, the misbehavior detection module 310 determines that the V2V message is a malicious V2V message.

A malicious V2V message may be a V2V message that appears to be generated by an actual vehicle but is a V2V message generated by a malicious entity. The malicious entity may be attempting a sybil attack where the malicious V2V message is generated by a ghost vehicle or a non-existent vehicle. The misbehavior detection module 310 is configured to inform the V2X application that the received V2V message is a malicious V2V message and to disregard the source vehicle data associated with the malicious V2V message thereby ensuring that the ADS does not implement navigation and/or guidance actions based on the source vehicle data included in the malicious V2V message.

The V2V message includes a source vehicle identifier that identifies a source vehicle that allegedly transmitted the V2V message to the autonomous vehicle 100. If the misbehavior detection module 310 determines that a received V2V message is a malicious V2V message, the misbehavior detection module 310 classifies the source vehicle identifier associated with the malicious V2V message as a malicious source vehicle identifier. In an embodiment, the misbehavior detection module 310 is configured to inform the communication module 308 that the source vehicle identifier associated with the received malicious V2V message is a malicious source vehicle identifier so that the communication module 308 identifies future received V2V messages including the malicious source vehicle identifier as malicious V2V messages and disregards the source vehicle data associated with such malicious V2V messages.

In an embodiment, the misbehavior detection module 310 is configured to inform the misbehavior reporting module 312 that the source vehicle identifier associated with a received malicious V2V message is a malicious source vehicle identifier. The misbehavior reporting module 312 transmits a classification report including the malicious source vehicle identifier to the SCMS 302.

In an embodiment, when the misbehavior detection module 310 classifies a source vehicle identifier as a malicious source vehicle identifier, the misbehavior reporting module 312 generates a classification report including a unique identifier based on the license plate of the vehicle, vehicle features, and a V2V message or BSM identifier for the vehicle and maps the unique identifier with the classification of the vehicle as a legitimate vehicle or a malicious vehicle. The misbehavior reporting module 312 is configured to transmit the classification report to the SCMS 302.

In an embodiment, misbehavior authority 306 at the SCMS 302 receives the classification report including the malicious source vehicle identifier and broadcasts the malicious source vehicle identifier to the other vehicles in the vicinity of the autonomous vehicle 100 that identified the malicious source vehicle identifier so that the other vehicles identify received V2V messages associated with the malicious source vehicle identifier as a malicious V2V messages and disregard the source vehicle data associated with the malicious V2V messages.

While a number of different components of the automated vehicle 100 and the controller 134 are shown in FIG. 3, the autonomous vehicle 100 and/or the controller 134 may include additional components that facilitate operation of the autonomous vehicle.

Figure 4:
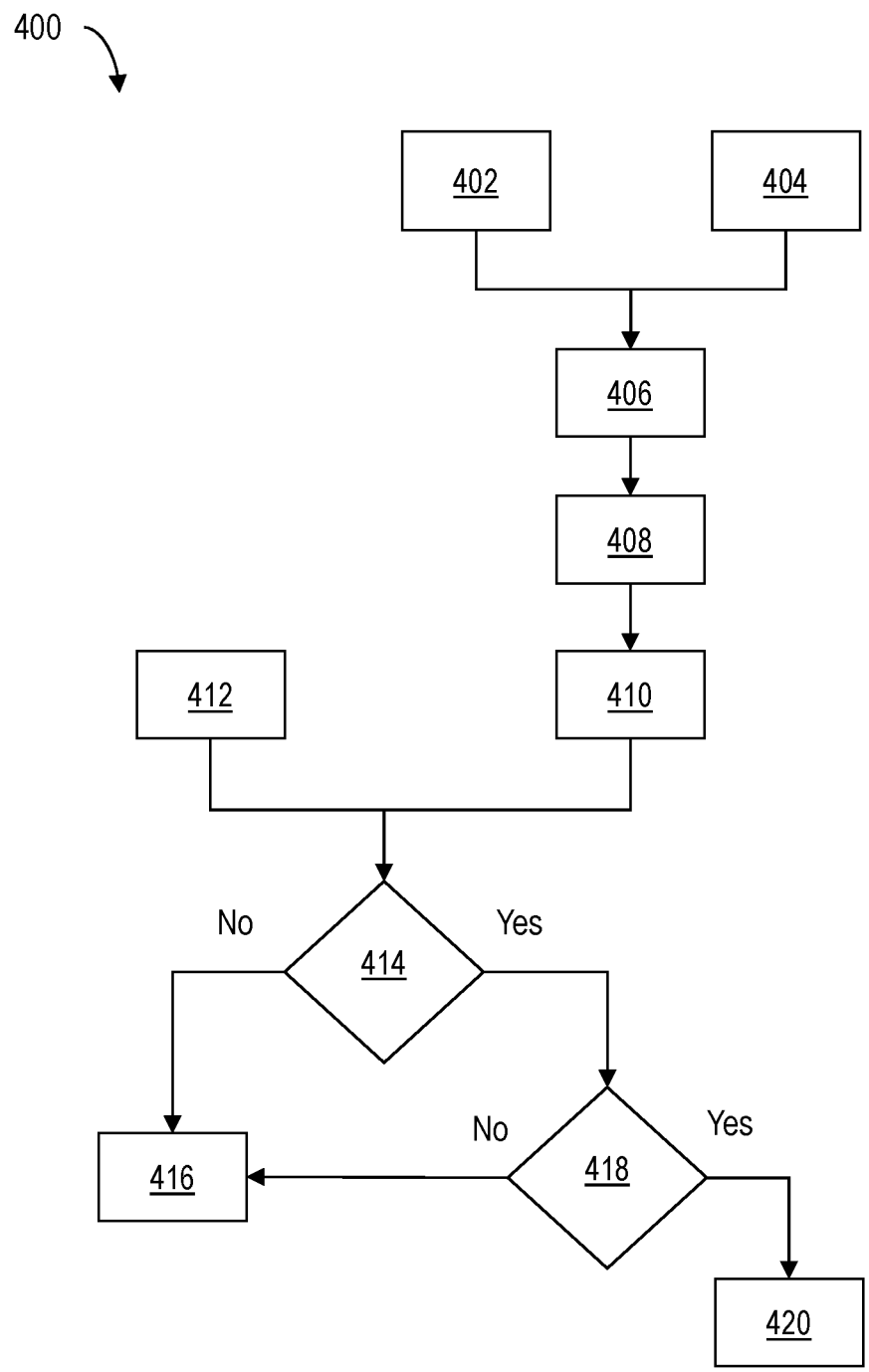
FIG. 4 is a flow chart representation of an embodiment of a method of generating a fusion data message at a MEC system and detecting misbehavior based on fusion data in the fusion message at the automated driving system (ADS) of an autonomous vehicle.

Referring to FIG. 4, a flow chart representation of an embodiment of a method 400 of generating a fusion data message at a MEC system 150 and detecting misbehavior based on fusion data in the fusion data message at the automated driving system (ADS) of an autonomous vehicle 100 shown. The method 400 is performed by a controller 134 including an embodiment of a misbehavior detection system 110 and the MEC system 150. The method 400 may be performed by the MEC system 150 and the controller 134 in combination with other components of the autonomous vehicle 100. The method 400 may be performed by hardware circuitry, firmware, software, and/or combinations thereof. The method 400 is described with reference to FIG. 2 and FIG. 3.

At 402, the collaborative sensing module 214 receives RSU sensed data generated by the RSU sensor system 204. The RSU sensed data is associated with vehicles located within range of the RSU sensor system 204. The RSU sensed data does not include specific vehicle coordinates associated with the different vehicles within range of the RSU sensor system 204.

At the 404, the collaborative sensing module 214 receives vehicle sensed data. The RSU communication system 206 at the MEC system 150 receives V2I messages including the vehicle sensed data from vehicles within range of the RSU 152. The vehicle sensed data received from a vehicle is associated with other vehicles and objects within range of the vehicle sensing system of that vehicle.

At 406, the collaborative sensing module 214 generates fusion data based on the RSU sensed data generated by the RSU sensor system 204 and the vehicle sensed data received in the V2I messages from the vehicles within range of the RSU 152. The collaborative sensing module 214 is configured to fuse the RSU sensed data and the vehicle sensed data using global coordinates, such for example GPS coordinates, to generate the fusion data. In an embodiment, the collaborative sensing module 214 applies a first weight to the RSU sensed data and a second weight to vehicle sensed data to generate the fusion data, where the first weight is greater than the second weight. A V2I message received at the RSU 152 may be a malicious message. The lower weight is applied to the vehicle sensed data received in V2I messages to reduce the impact of potentially malicious V2I messages on the integrity of the fusion data.

At 408, the MEC system 150 broadcasts a fusion data message including the fusion data generated by the collaborative sensing module 214. At 410, the fusion data message including the fusion data is received at the misbehavior detection system 110 of the autonomous vehicle 100 via the vehicle communication system 136.

At 412, a V2V message including source vehicle data and a source vehicle identifier is received at the misbehavior detection system 110 at roughly the same time as the fusion data message is received at the misbehavior detection system 110 at 410. The V2V message is received at the misbehavior detection system 110 via the vehicle communication system 136 and the communication module 308. The source vehicle data includes vehicle attributes of the source vehicle. Examples of the vehicle attributes include, but are not limited to, a speed of the source vehicle, a source vehicle location, an acceleration of the source vehicle, and a heading of the source vehicle.

At 414, the misbehavior detection system 110 determines whether a source vehicle is actually located at the source vehicle location received in the V2V message. The misbehavior detection system 110 transforms the fusion data based on global coordinates into coordinates associated with specific vehicles. The misbehavior detection system 110 compares the coordinates associated with the specific vehicles based on the fusion data with the coordinates associated with the source vehicle location received in the V2V message to determine whether a source vehicle is physically located at the source vehicle location specified in the V2V message.

In an embodiment, if the misbehavior detection system 110 determines at that a source vehicle is not physically located at the source vehicle location received in the V2V message at 414, the misbehavior detection system 110 determines that the V2V message is a malicious V2V message at 416. The malicious V2V message may be a V2V message that appears to be generated by an actual vehicle but is a V2V message generated by a malicious entity. The malicious entity may be attempting a sybil attack where the malicious V2V message is generated by a ghost vehicle or a non-existent vehicle.

The misbehavior detection system 110 informs the V2X application that the received V2V message is a malicious V2V message and to disregard the source vehicle data associated with the malicious V2V message thereby ensuring that the ADS does not implement navigation and/or guidance actions based on malicious source vehicle data. In an embodiment, the misbehavior detection system 110 generates a classification report that includes the malicious source vehicle identifier and transmits the classification report including the malicious source vehicle identifier to the SCMS 302. The misbehavior authority 306 at the SCMS 302 stores the malicious source vehicle identifier at the SCMS 302. The misbehavior authority 306 broadcasts the malicious source vehicle identifier to the autonomous vehicles disposed within a vicinity of the autonomous vehicle 100.

If the misbehavior detection system 110 determines that a source vehicle is physically located at the source vehicle location received in the V2V message at 414, the misbehavior detection system 110 performs a vehicle plausibility check of the vehicle attributes included in the V2V message to determine whether the V2V message is a legitimate V2V message at 418. The vehicle plausibility check is used to determine whether the V2V vehicle data is plausible. In an embodiment, the vehicle plausibility check includes one or more of a source vehicle speed plausibility check, a source vehicle position plausibility check, a vehicle acceleration plausibility check, a vehicle sudden appearance plausibility check, a vehicle message frequency plausibility check, a vehicle heading plausibility check, and a vehicle successive message consistency plausibility check.

If the misbehavior detection system 110 determines that the vehicle attributes pass the vehicle plausibility check at 418, the misbehavior detection system 110 determines that the V2V message is a legitimate V2V message at 420. Upon the identification of the V2V message as a legitimate V2V message, the controller 134 is configured to implement ADS in the autonomous vehicle 100 in accordance with the source vehicle data associated with the legitimate V2V message.

Figure 5:
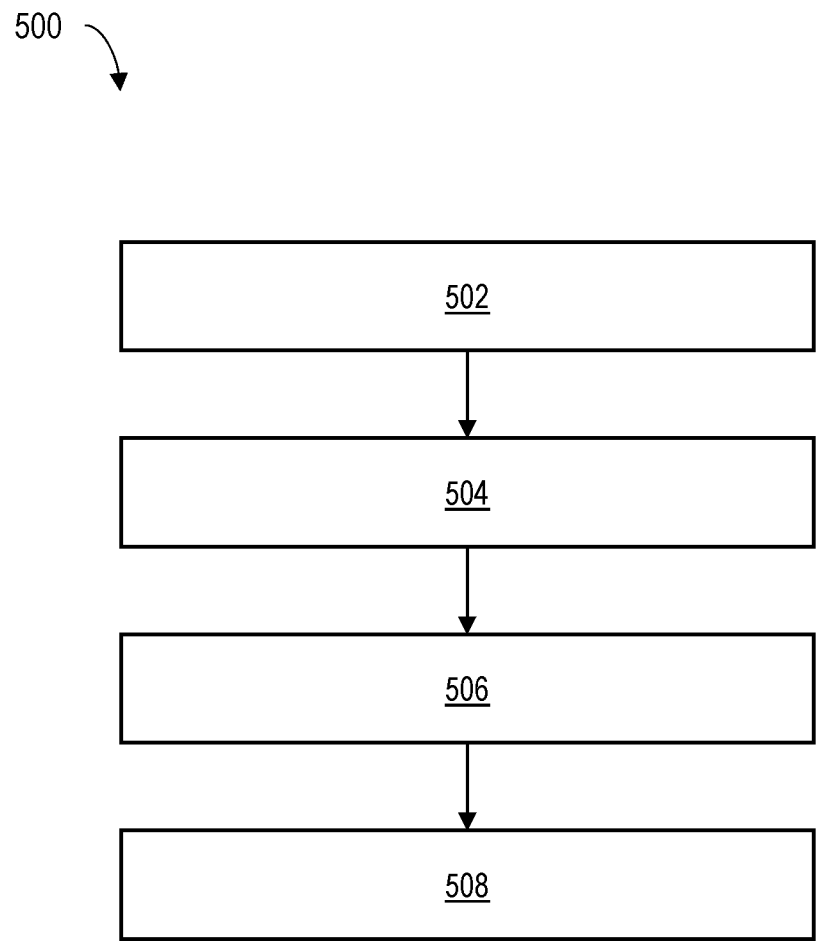
FIG. 5 is a flow chart representation of an embodiment of a method of detecting misbehavior based on fusion data at the ADS of an autonomous vehicle.

Referring to FIG. 5, a flow chart representation of an embodiment of a method 500 of detecting misbehavior based on fusion data at the ADS of an autonomous vehicle 100 is shown. The method 500 is performed by a controller 134 including an embodiment of a misbehavior detection system 110. The method 500 may be performed by the controller 134 in combination with other components of the autonomous vehicle 100. The method 500 may be performed by hardware circuitry, firmware, software, and/or combinations thereof.

At 502, a V2V message including source vehicle data is received at the autonomous vehicle 100, the source vehicle data including a source vehicle location. At 504, a fusion data message including fusion data is received from a MEC system 150 including a RSU 152 at the autonomous vehicle 100, the fusion data being based on RSU sensed data and on vehicle sensed data received at the RSU 152 from at least one vehicle. At 506, the misbehavior detection system 110 determines whether a source vehicle is disposed at the source vehicle location based on the fusion data. At 508, the ADS manages performance of the autonomous vehicle 100 in accordance with the source vehicle data based at least in part on the determination.

The use of a misbehavior detection systems 110 at autonomous vehicles 100 may facilitate the identification of sybil attacks by malicious or ghost vehicles based on a determination of whether an actual vehicle is disposed at a source vehicle location in received V2V message based on fusion data generated by the collaborative sensing module 214. The identification of sybil attacks by malicious entities may reduce the incorporation of malicious source vehicle data received via malicious V2V messages into the Intelligent Transportation System (ITS) of autonomous vehicles 100. The use of misbehavior detection systems 110 at autonomous vehicles 100 may assist with the removal of misbehaving or malicious entities from the V2X ecosystem thereby protecting the autonomous vehicles 100 as well as the overall the autonomous vehicle system. The use of the collaborative sensing module 214 may also permit the identification of malicious V2V messages generated by malicious entities posing as ghost vehicles that appear to be in location where the presence of or absence of an actual vehicle cannot be sensed by the vehicle sensor system 128 of the autonomous vehicle 100.

While at least one exemplary embodiment has been presented in the foregoing detailed description, it may be appreciated that a vast number of variations exist. It may also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is to be understood that various changes can be made in the function and arrangement of elements without departing from the scope of the disclosure as set forth in the appended claims and the legal equivalents thereof.

What is claimed is:

1. An automated driving system (ADS) of an autonomous vehicle including a misbehavior detection system, comprising:
   a communication module configured to:
      receive a vehicle-to-vehicle (V2V) message from a source vehicle comprising source vehicle data, the source vehicle data including a source vehicle location; and
      receive a fusion data message comprising fusion data from a mobile edge computing (MEC) system including a roadside unit (RSU), the fusion data being based on RSU sensed data and on vehicle sensed data received at the RSU from the source vehicle, wherein the RSU sensed data is information sensed by the RSU about the source vehicle and the vehicle sensed data is information communicated by the source vehicle to the autonomous vehicle about the source vehicle;
   a misbehavior detection module configured to:
      determine whether a source vehicle is disposed at the source vehicle location based on the fusion data;
      classify the source vehicle as a malicious entity upon a determination that the source vehicle is not disposed at the source vehicle location;
      classify the V2V message received from the malicious entity as a malicious V2V message upon the determination that the source vehicle is not disposed at the source vehicle location; and
   a processor configured to manage performance of the autonomous vehicle in accordance with the source vehicle data based at least in part on the determination.

2. The system of claim 1, wherein the fusion data is based on a weighted RSU sensed data and a weighted vehicle sensed data, a first weight associated with the RSU sensed data being greater than a second weight associated with the weighted vehicle sensed data.

3. The system of claim 1, wherein the misbehavior detection module is configured to determine whether the source vehicle data passes a vehicle plausibility check and the processor is configured to manage performance of the autonomous vehicle in accordance with the source vehicle data based in part on the determination.

4. The system of claim 3, wherein the vehicle plausibility check of the source vehicle data comprises at least one of source vehicle speed plausibility check, a source vehicle position plausibility check, a vehicle acceleration plausibility check, a vehicle sudden appearance plausibility check, a vehicle message frequency plausibility check, a vehicle heading plausibility check, and a vehicle successive message consistency plausibility check.

5. The system of claim 1, wherein the misbehavior detection module is configured to disregard the source vehicle data associated with the malicious V2V message by not implementing navigation actions based on the source vehicle data including in the malicious V2V message.

6. The system of claim 5, further comprising a misbehavior reporting module configured to report a source vehicle identifier associated with the malicious V2V message to a security credentials management system (SCMS).

7. The system of claim 1, wherein the fusion data message comprises a message broadcast by the MEC system.

8. A computer readable medium comprising instructions stored thereon for detection of misbehavior at an automated driving system (ADS), that upon execution by a processor, cause the processor to:

receive a vehicle-to-vehicle (V2V) message from a source vehicle comprising source vehicle data, the source vehicle data including a source vehicle location; and receive a fusion data message comprising fusion data from a mobile edge computing (MEC) system including a roadside unit (RSU), the fusion data being based on RSU sensed data and on vehicle sensed data received at the RSU from the source vehicle, wherein the RSU sensed data is information sensed by the RSU about the source vehicle and the vehicle sensed data is information communicated by the source vehicle to the autonomous vehicle about the source vehicle;

determine whether a source vehicle is disposed at the source vehicle location based on the fusion data;

classify the source vehicle as a malicious entity upon a determination that the source vehicle is not disposed at the source vehicle location;

classify the V2V message received from the malicious entity as a malicious V2V message upon the determination that the source vehicle is not disposed at the source vehicle location; and manage performance of an autonomous vehicle in accordance with the source vehicle data based at least in part on the determination.

9. The computer readable medium of claim 8, further comprising instructions to cause the processor to receive the fusion data message comprising the fusion data, the fusion data being based on a weighted RSU sensed data and a weighted vehicle sensed data, a first weight associated with the RSU sensed data being greater than a second weight associated with the weighted vehicle sensed data.

10. The computer readable medium of claim 8, further comprising instructions to cause the processor to determine whether the source vehicle data passes a vehicle plausibility check and manage performance of the autonomous vehicle in accordance with the source vehicle data based in part on the determination.

11. The computer readable medium of claim 10, further comprising instructions to cause the processor to perform the vehicle plausibility check of the source vehicle data, the vehicle plausibility check comprising at least one of source vehicle speed plausibility check, a source vehicle position plausibility check, a vehicle acceleration plausibility check, a vehicle sudden appearance plausibility check, a vehicle message frequency plausibility check, a vehicle heading plausibility check, and a vehicle successive message consistency plausibility check.

12. The computer readable medium of claim 8, further comprising instructions to disregard the source vehicle data associated with the malicious V2V message by not implementing navigation actions based on the source vehicle data included in the malicious V2V message.

13. The computer readable medium of claim 12, further comprising instructions to cause the processor to report a source vehicle identifier associated with the malicious V2V message to a security credentials management system (SCMS).

14. The computer readable medium of claim 8, further comprising instructions to cause the processor to receive the fusion data message, the fusion data message comprising a message broadcast by the MEC system.

15. A method of detecting misbehavior at an automated driving system (ADS) of an autonomous vehicle comprising:

receiving a vehicle-to-vehicle (V2V) message from a source vehicle comprising source vehicle data at the autonomous vehicle, the source vehicle data including a source vehicle location;

receiving a fusion data message comprising fusion data from a mobile edge computing (MEC) system including a roadside unit (RSU) at the autonomous vehicle, the fusion data being based on a weighted RSU sensed data and on a weighted vehicle sensed data received at the RSU from the source vehicle, a first weight associated with the RSU sensed data being greater than a second weight associated with the weighted vehicle sensed data, wherein the weighted RSU sensed data is information sensed by the RSU about the source vehicle and the vehicle sensed data is information communicated by the source vehicle to the autonomous vehicle about the source vehicle;

determining whether a source vehicle is disposed at the source vehicle location based on the fusion data at a misbehavior detection system;

classifying the source vehicle as a malicious entity upon a determination that the source vehicle is not disposed at the source vehicle location, wherein the malicious entity is defined as one of a ghost vehicle or a non-existent vehicle;

classifying the V2V message received from the malicious entity as a malicious V2V message upon the determination that the source vehicle is not disposed at the source vehicle location; and managing performance of the autonomous vehicle in accordance with the source vehicle data based at least in part on the determination by disregarding the source vehicle data associated with the malicious V2V message by not implementing navigation action based on the source vehicle data included in the V2V message.

16. The method of claim 15, further comprising determining whether the source vehicle data passes a vehicle plausibility check at the misbehavior detection system and manage performance of the autonomous vehicle in accordance with the source vehicle data based in part on the determination.

17. The method of claim 16, further comprising performing the vehicle plausibility check of the source vehicle data, the vehicle plausibility check comprising at least one of source vehicle speed plausibility check, a source vehicle position plausibility check, a vehicle acceleration plausibility check, a vehicle sudden appearance plausibility check, a vehicle message frequency plausibility check, a vehicle heading plausibility check, and a vehicle successive message consistency plausibility check.

18. The method of claim 15, further comprising reporting a source vehicle identifier associated with a malicious V2V message to a security credentials management system (SCMS).

* * * * *